(12) United States Patent
Kempenaers et al.

(10) Patent No.: US 9,091,058 B2
(45) Date of Patent: Jul. 28, 2015

(54) ANTI-SNAKING SWELLABLE WATER-STOPS

(71) Applicant: W. R. Grace & Co.-Conn., Columbia, MD (US)

(72) Inventors: Peter J. Kempenaers, Nieuwrode (BE); Pascal A. Geudens, Olen (BE); Michel J. de Ruijter, Mechelen (BE)

(*) Notice: Subject to any disclaimer, the term of this patent is extended or adjusted under 35 U.S.C. 154(b) by 0 days.

(21) Appl. No.: 14/099,932

(22) Filed: Dec. 7, 2013

(65) Prior Publication Data
US 2015/0113894 A1    Apr. 30, 2015

(30) Foreign Application Priority Data

Oct. 24, 2013    (EP) ..................................... 13190130

(51) Int. Cl.
*E04B 1/68*    (2006.01)
(52) U.S. Cl.
CPC ............. *E04B 1/6806* (2013.01); *E04B 1/6807* (2013.01); *E04B 2001/6818* (2013.01)
(58) Field of Classification Search
CPC ....... E04B 1/68; E04B 1/6813; E04B 1/6806; E04B 2001/6818
USPC ........... 52/393, 396.04, 396.08, 396.1, 309.3; 264/298
See application file for complete search history.

(56) References Cited

U.S. PATENT DOCUMENTS

| | | | | |
|---|---|---|---|---|
| 3,848,379 | A | * | 11/1974 | Hazen ........................... 52/220.5 |
| 3,849,958 | A | * | 11/1974 | Balzer et al. ................ 52/396.05 |
| 4,366,284 | A |   | 12/1982 | Ishido et al. |
| 4,367,254 | A | * | 1/1983 | Franklin et al. .................. 428/85 |
| 4,443,019 | A | * | 4/1984 | Ishido et al. .................... 277/652 |
| 4,460,737 | A | * | 7/1984 | Evans et al. .................... 524/584 |
| 4,533,278 | A | * | 8/1985 | Corsover et al. ................ 404/65 |

(Continued)

FOREIGN PATENT DOCUMENTS

| | | |
|---|---|---|
| DE | 19900520 A1 | 7/2000 |
| EP | 0037717 A1 | 10/1981 |

(Continued)

OTHER PUBLICATIONS

Galanti, European Search Report for European Patent Application No. EP13190130, dated Mar. 31, 2014, 2 pages.
Galanti, European Search Opinion for European Patent Application No. EP13190130, dated Mar. 31, 2014, 3 pages.
Grace Waterproofing Products, ADCOR™ ES Engineered Swell Hydrophilic Waterstop strip, dated Dec. 2010, 2 pages.

*Primary Examiner* — Brent W Herring
(74) *Attorney, Agent, or Firm* — Craig K. Leon

(57) ABSTRACT

The invention provides an aqueously-swellable water stop having an elongate body formed by shaping or extruding a composition mixture comprising water swelling fillers and/or polymers (e.g. Bentonite, super absorbent polymers, hydrophilic polymers), at least one elastomer or polymer, and preferably at least one plasticizer, the composition mixture when formed into an elongate water stop body having a Shore A hardness (durometer) of less than 35 and more preferably in the range of 5-35 (measured at 21° C.). The water stop body has at least one major face and a layer of pressure-sensitive adhesive attached to the face for bonding to a concrete substrate. The water stop of the invention does not require use of rigid metal and hard plastic inner cores as in prior water stop designs, and avoids curling and snaking that would allow concrete poured against the water stop to invade between the first substrate and the water stop body, and thereby providing full bonding between the water stop and thus protecting against leakage through concrete construction joints.

20 Claims, 1 Drawing Sheet

(56) References Cited

U.S. PATENT DOCUMENTS

| | | | |
|---|---|---|---|
| 4,740,404 A * | 4/1988 | Otsugu et al. | 428/44 |
| 5,171,100 A * | 12/1992 | Bergstedt et al. | 404/68 |
| 5,282,693 A * | 2/1994 | Daily, Jr. | 404/47 |
| 5,290,844 A * | 3/1994 | Otsuka | 524/426 |
| 5,916,394 A * | 6/1999 | Prochaska et al. | 156/83 |
| 5,988,648 A * | 11/1999 | Schmid | 277/316 |
| 6,112,488 A * | 9/2000 | Olson et al. | 52/393 |
| 8,671,489 B2 * | 3/2014 | Gallai et al. | 14/73.1 |
| 2003/0131550 A1 * | 7/2003 | Cole et al. | 52/396.04 |
| 2005/0194752 A1 * | 9/2005 | Klosowski et al. | 277/650 |
| 2011/0042613 A1 | 2/2011 | Loehner et al. | |
| 2014/0166665 A1 * | 6/2014 | McNamara | 220/565 |

FOREIGN PATENT DOCUMENTS

| | | |
|---|---|---|
| EP | 0050906 A1 | 5/1982 |
| EP | 0160448 A2 | 11/1985 |
| EP | 0410669 A2 | 1/1991 |
| EP | 0900834 A1 | 3/1999 |
| GB | 2084602 A | 4/1982 |
| JP | 5761077 A | 4/1982 |
| JP | 2011231485 A | 11/2011 |

* cited by examiner

ANTI-SNAKING SWELLABLE WATER-STOPS

FIELD OF THE INVENTION

The present invention relates to so-called "active" water stop devices for use in concrete construction joints, and more particularly to novel and improved aqueously-swellable water stops having an adhesive layer and a specific Shore A (durometer) hardness range for maintaining continuous contact with concrete and effective conformability within a concrete construction joint.

BACKGROUND OF THE INVENTION

It is known to employ passive water stop devices in the joints or gap openings arising between concrete building structure members, such as floor slabs and wall-floor segments which are sequentially formed. For example, a concrete floor slab is cast; then an adjacent floor slab or wall segment is subsequently cast against it. As concrete shrinks during curing, a gap opening can arise in the construction joint between these separately formed concrete members. There is an opportunity for water to pass through the joint, especially in sub-grade installations. A plastic sheet or steel member can be located within this "cold joint" or gap opening, so as to create a tortuous path for impeding the travel of water into or out of the structure.

It is also known to employ active water stops that swell upon contact with water from the inside or outside of the concrete structure, such that the water stop expands to fill up the joint or gap opening and thereby prevents water from entering or exiting the concrete structure. Aqueously-swelling water stop designs are disclosed in European Application Publications No. 0 050 906 A1 of Ishido et al. (Application No. 813000341.5); No. 0 037 717 A1 of Yamaji et al. (Application No. 81301443.8); and No. 0 160 448 A2 of Harriett (Application No. 85302656.5).

In the aforementioned EP No. 0 050 906 A1 (owned by Hayakawa Rubber Company), Ishido et al. disclosed a sealing process using an aqueously-swelling sealant composition comprising 10 to 40 weight percent of rubber whose main ingredient is "reclaimed" rubber, 10 to 20 weight percent of silicic compound, 10 to 60 weight percent of bentonite, and 10 to 40 weight percent of plasticizer. It was taught that this composition could be extruded with or without a core therein, and could be inserted into a joint gap or other gap of structure members to stop water at the gap. (See also U.S. Pat. No. 4,366,284 of Ishido et al.).

In EP No. 0 037 717 A1 (also owned by Hayakawa), Yamaji '717 A1 et al. disclosed a water stopper having an aqueously-swelling water-stopping composition consisting of 10 to 40 weight percent of rubber whose main ingredient is polyisobutylene, 10 to 20 weight percent of silicate, 10 to 60 weight percent of bentonite, the silicate and bentonite acting as "fillers," and 10 to 40 weight percent of plasticizer. This is extruded into an elongate water stopper, with or without a core therein, for use in a joint gap.

In EP No. 0 160 448 A2, Harriett disclosed a composition comprising bentonite intimately contacted with polypropylene, polybutylene, or mixtures thereof, which could be extruded into a rope, rod, or other shape for preventing water seepage in a gap.

In US Patent 2011/0042613, Loehner et al. disclosed a water-swellable composition containing hydrophilic cross-linked polymer particles.

In EP No. 0 900 834, Tagoshi et al. taught a water-swellable elastomer composition containing N-vinylcarboxylic acid amide-based cross-linked resin and a water-swellable polyurethane.

To ensure good water sealing performance, however, it is imperative that the aqueously-swellable water stop maintain continuous contact over its entire length with the concrete surrounding the construction joint. As the density of concrete is higher than the density of these prior art water stops, the water stop will tend to float in the wet concrete that is poured against previously installed concrete; and this sometimes results in the rubber water stop being dislodged so that it "snakes" (or curls). This snaking or curling is amplified by the tendency of the water stop to expand in contact with the water of the wet concrete, immediately after casting of the concrete. The expansion of these prior art water stops is a tri-dimensional process; or, in other words, the water stop will not only swell in height and width but it will also tend to increase in length.

Snaking can result in concrete flowing between the water stop and the first poured concrete, giving rise to a separate construction joint (or gap opening) which cannot be plugged by the water-stop device. Risks of water seepage thus increase.

A contact adhesive can be used to keep the water stop in place while the subsequent concrete structure is cast against it and allowed to cure in place. However, as the grip of the adhesive builds slowly in most situations, the practice hitherto for ensuring that the water stop stays in place during the pouring and curing of the concrete (especially in vertical and hanging applications) is to drive a nail through the water stop every 20-30 centimeters. However, it is time consuming to ensure such contact adhesive is applied correctly along the full length of the waterstop, to allow for curing and to drive nails through the water stops. Also, such contact adhesives do not work well if the concrete surface becomes wet due to rain during curing.

Another solution is to install a metal mesh or cage over the water stop and fasten it against the concrete at 20-30 cm intervals. This kind of installation is unsatisfactory where steel rebar intrudes into installation space or other irregularities exist.

Overall, the need to use contact adhesive, cages, nails, and other fasteners means time-consuming, highly labor-intensive work such that the quality of the job will depend upon diligence and skill of the applicator. Nails and cages cannot be used in installations that require sealing around pipes, moreover. The water stop must be kept in place by means of metal wires. Again, this increases the labor required for installation as well as the dependence upon the diligence and skill of the applicator for success of the job.

In view of the foregoing disadvantages of the prior art, the present inventors believe that a novel and inventive water stop design and method for concrete construction joint water stopping are sorely needed. Such an improved water stop needs to resist the deformation of the water stop body which tends to destroy or to disrupt continuous contact between the water stop and surrounding concrete within the construction joint or gap opening.

SUMMARY OF THE INVENTION

In surmounting the disadvantages of the prior art, the present invention provides a novel and inventive aqueously-swellable water stop and method for water stopping which will permit installations on irregular, moist, or even uncured concrete surfaces, as well as around pipes, metal rebar, or other installation details, while avoiding the necessity for using nails, cages, and other mechanical devices for fastening the water stop into place within the concrete construction joint.

Water stops of the invention resist the disruptive forces and conditions which operate to defeat the continuous contact between the length of the water stop and the concrete surfaces which define the joint. Water stops of the present invention permit installation onto green concrete (as no curing of the concrete is required), such that a second concrete structure can be cast against the water stop without increasing risks of "snaking" or curling that might allow concrete to flow between the first concrete surface and water stop.

The above "snaking/curling" problem has been hinted at by the prior art but not fully understood, let alone resolved, until the present invention. For example, in EP Publ. No. 0 050 906 A1, Ishido et al. mentioned that water sealants may have good adhesiveness but be too soft and sticky, or otherwise become too hard in winter, and over time can lose resiliency or become subject to the creep phenomenon and thus "less adaptable to fluctuation in the structural gap" (EP '906 A1, at page 2, lines 1-11). In EP Publ. 0 037 717 A1, Yamaji et al. explained that plasticizers can be adjusted to produce proper hardness of the (water stop) composition to meet specific requirements, but that too much hardness could inhibit swelling, and too much plasticizer could cause low shaping workability and low resistance against water pressure (EP 717 A1 at page 12, lines 6-17).

In EP Publ. No. 0 410 669 A2, Otsuka discloses adhesive vulcanized rubber water stops having specified tensile strength, elastic modulus, ultimate elongation at break and degree of swelling, wherein the body of the water stop itself is intended to be adhesive. However, the present inventors believe that water stops having entire body structures which themselves are designed to be adhesive (e.g., to provide bonding strength sufficient to withstand environmental conditions and concrete pouring), are difficult to handle and to apply in actual construction joint applications. Moreover, the present inventors believe that Otsuka's teachings regarding highly tackified, rigid water stops is not the answer because the force of poured concrete will tend to overcome the surface tackiness too easily resulting in the water stop being wrenched from its installation; and otherwise the adhesion would be insufficient for withstanding three days of complete immersion (e.g., in heavy rain).

Thus, contrary to the teachings of the prior art, the present inventors have surprisingly discovered that water stop compositions with the specific Shore A hardness (durometer) in combination with a layer of pressure sensitive adhesive provides such an excellent, fully-bonded system that the water stop will remain in place during pouring of the concrete from as high as three meters, and such that the installed water stop remains adhered to the concrete during at least three days in case of complete immersion in water.

While it is conceivable that aqueously-swellable water stops can have "hardness" or "softness" that span across the entire range of possibility, the present inventors realized that a patentable improved design and water-stopping method could be achieved by using, for application in concrete construction joints, a water stop which comprises at least one outer synthetic pressure-sensitive adhesive layer (e.g., synthetic rubber based) having an average thickness of at least 50 micrometers, this at least one adhesive layer being attached to an outer major face of an elongated, aqueously-swellable water stop body which is formed of water-swellable fillers and/or polymers and preferably at least one elastomer, wherein the composition mixture has Shore A hardness (durometer) of less than 35, and more preferably a Shore A hardness of 5-35 (as measured at 21° C.).

Thus, an exemplary water stop of the present invention comprises: an elongate body having at least one major face extending along the direction of elongation; at least one layer of synthetic pressure-sensitive adhesive having an average layer thickness of at least 50 micrometers attached to the at least one major face of the elongate body; the elongate body being formed by shaping a composition mixture comprising aqueously-swellable fillers or polymers, at least one elastomer, preferably (although not necessarily) at least one plasticizer, wherein the composition mixture after being shaped into the elongate body has a preferred Shore A hardness of 5 to 35 (measured at 21° C.) at all points along the at least one major face of the elongate water body; the elongate body thereby having an expansion of at least 120 percent of original volume after continuous immersion in water. The measurement of volume expansion is performed according JIS K 6258-1993 or ASTM D471. All measurements of durometer Shore A hardness and water stop volume expansion, unless otherwise indicated, are understood herein to be taken at approximately 21 degrees Celcius ("at 21° C.").

Testing water used for the immersion of the waterstops is tap water having a pH of 7.5-8.5, an electrical conductivity of 400-500 μS/cm, and a total hardness of 15-20° F., which is equal to 8.4-11.2° D. The Shore A hardness is measured according ISO 7619:1997. The Shore A hardness figures set forth herein should be read as "value/3" which means that, for example, a Shore A hardness of 35 can be designated as Shore A "35/3" wherein "35" is the value indicated on the durometer equipment at 3 seconds after bringing the pressure foot of the durometer in firm physical contact with the test piece, as described in note 3 of paragraph 10, "Test Report" of ISO 7619:1997.

Methods for waterproofing a concrete joint using the above-described water stop are also described hereinafter.

While not intending to be bound by theory, the present inventors believe that when Shore A hardness (durometer) of the water stop elongated body is greater than 35 (when measured at 21° C.), the forces caused by the expansion of the water stop body will exceed the bonding force of adhesive to the substrate, and this will result in dislocation of the water stop from the mounting surface when immersed in water, and consequent snaking of the water stop that will result in leakage.

The present inventors surprisingly discovered that, when its hardness does not exceed 35 (Shore A as tested by durometer at 21° C.), the elongated water stop body will remain fully adhered to a concrete surface and allow the pressure-sensitive synthetic adhesive layer to withstand at least three days of continuous immersion under water. A water immersion test is performed by pressing the adhesive layer of the water stop (at least 10 cm length) to a dry concrete tile by hand. After three days this combination is completely immersed and placed horizontally in water having a pH of 7.5-8.5, an electrical conductivity of 400-500 μS/cm and a total hardness of 15-20° F., which is equal to 8.4-11.2° D, and a temperature of 21° C.-22° C. Every twenty-four hours, the set up is removed from the water and placed vertically and visually observed. The time of the water stop releasing from the concrete tile is reported in days. For some applications, the use of saline water, hard or soft water, water containing soil residues or different temperatures may be more appropriate.

In further exemplary embodiments of the invention, the water stop body has a Shore A hardness of 5-25, more preferably 10-20 or 10-15 (measured at 21° C.).

Further advantages and features of the invention are described in detail hereinafter.

BRIEF DESCRIPTION OF THE DRAWINGS

Further advantages and features of the present invention may be more readily comprehended when the following detailed description of preferred embodiments is taken in conjunction with the appended drawings wherein.

DETAILED DESCRIPTION OF PREFERRED EMBODIMENTS

Figure 1:
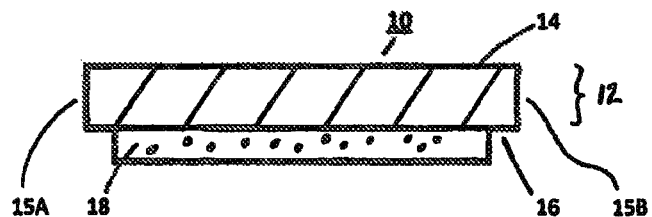
FIGS. 1-4 are cross-sectional diagrams of exemplary water stops comprising an elongate body that is made of an aqueously-swellable material having a Shore A hardness (durometer) of less than 35 (measured at 21° C.), and that has at least one major face attached to one or more pressure-sensitive synthetic adhesive layers for attachment to construction surfaces within a construction joint.

As illustrated by the cross-sectional perspective illustration of FIG. 1, an exemplary water stop 10 of the present invention for preventing seepage within a concrete construction joint comprises an elongate body 12 having at least one major face 16, and more preferably a second major face 14, defined between generally parallel edges or sides 15A and 15B, which extend along the direction of elongation (extending perpendicularly out of the plane of the drawing); at least one layer of pressure-sensitive synthetic adhesive 18 attached to the at least one major face 16 of the elongate body 12, the adhesive layer 18 having an average layer thickness of at least 50 micrometers and preferably no greater than 250 micrometers.

Figure 2:
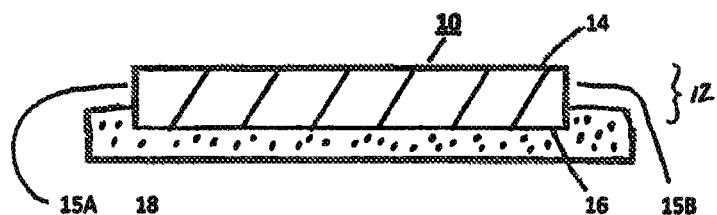

The pressure sensitive adhesive layer 18 may have the same width dimension as one or both of the major faces 16/14 of the water stop 10, or may have a smaller width dimension as shown in FIG. 1; and the adhesive layer 18 may also have a greater width, as shown in FIG. 2, such that the adhesive extends beyond the outer corner edges of the major face 16 of the water stop 10 body.

Figure 3:
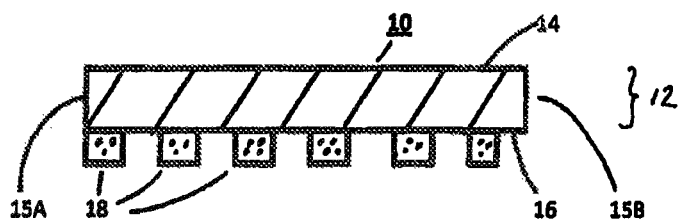

Further exemplary water stops 10 may also have a plurality of smaller strips along the length of major face 16 of the water stop 10 body as illustrated in FIG. 3.

Figure 4:
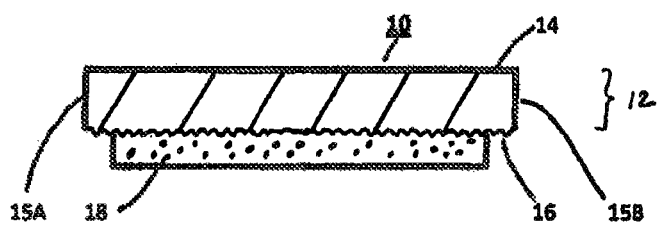

In still further exemplary embodiments of the invention, a major face 16 of the water stop 10 may have irregular or embossed surface such that the contact area with the adhesive layer 18 is larger, as illustrated in FIG. 4.

The water stop 10 may be formed by shaping a composition mixture comprising aqueously-swellable fillers or polymers, preferably at least one synthetic elastomer (synthetic rubber), and preferably though not necessarily at least one plasticizer, wherein the composition mixture after being shaped into the elongate body 12 has a Shore A hardness of less than 35 and more preferably has a Shore A hardness of 5-35 (the Shore A hardness being measured at 21° C.), and is aqueously-swellable when contacted with water within a concrete construction joint, such that water leakage is prevented through the joint installation.

It is not necessary for the elongate body 12 to have internal reinforcement structures or a rigid inner metal or hard plastic core. In fact, quite surprisingly the present inventors believe that a much more flexible water stop can achieve far superior water stoppage within a construction joint if the water stop can readily adhere to surfaces—which might have edges, corners, and other irregularities—without creasing, folding, or otherwise departing from surface-to-adhesive contact that could be defeated by using stiff or rigid internal reinforcements such as metal or hard plastic cores.

Preferably, the water stop body 12 is formed by extruding or shaping a composition mixture comprising aqueously-swellable fillers or polymers, at least one synthetic elastomer (synthetic rubber), and preferably (although not necessarily) at least one plasticizer, wherein the composition mixture after being shaped into the elongate body 12 has a Shore A hardness of less than 35, and more preferably has a Shore A hardness in the range of 5-35 (measured at 21° C.), and optional components (e.g., pigments, non-swellable fillers, superabsorbent polymer, processing aids) into a strip, ribbon, or bar form preferably without a harder inner core or reinforcement structure which could undermine flexibility and resilience of the water stop 10.

The water stop 10 properties should be adjusted to achieve, in concert with the separate pressure-sensitive adhesive layer, a fully bonded system within the concrete construction joint. The concept of "fully bonded" refers to continuous contact between the water stop 10 and concrete surface within the joint, such that leakage of water is prevent through the joint.

The water stop 10 can, for example, be formed or shaped by extruding the composition mixture (e.g., elastomer and bentonite) continuously as a strip, ribbon, or bar, which is cut to the desired length, before or after being attached to the pressure-sensitive synthetic adhesive layer 18 shown in FIG. 1. For example, the elongate body 12 could be made as a half cylinder or half-ovoid or half-elliptical body having one flat major surface extending along its length. In further exemplary embodiments, more than one adhesive layer can be employed on the outer surface of the water stop body 12, such as in addition to the layer 18 shown, or, as shown in FIG. 1, on an opposing major face 14 of the water stop body 12, and/or on any of the minor faces shown along edges 15A and 15B.

Release sheets (e.g., wax or siliconized paper—not illustrated) can be used to protect the at least one pressure-sensitive adhesive layer 18 (and optional adhesive layer 14) during shipment and are removed before application.

Exemplary water stops 10 can be produced as strips having overall 1-10 meter length, and most preferably in 5 meter length, and having width and thickness dimensions of 10-50 mm. (width)×5-35 mm. (thickness). The thickness of the pressure-sensitive adhesive layer 18 (and optional layer 14) should be at least 50 μm or more, and the width of the pressure-sensitive adhesive layer 18 in the edge 15A to edge 15B direction can vary from 10% to 100% of the width of the water stop 10. The pressure-sensitive adhesive layer 18 could also be made as a continuous envelope or jacket around the water stop elongate body 12 if desired.

Preferably, the composition mixture 12, after being shaped into the elongate body, has a minimum expansion of at least 120% of the original volume after immersion in water. The water stop composition could be chosen to have, for example, a minimum expansion of 120%-600% or more, compared to original volume before immersion in water, depending upon the components used in the composition mixture 12. In further exemplary embodiments of the invention, the expansion of the water stop could be 120%-420%, 620%, or 720% or greater, depending upon the components employed. (For example, a volume expansion of 450% means that the water stop expanded 550% compared to original volume).

For most commercial applications, an expansion of 3-4 times original volume is desired, and the selection of appropriate expansible materials (e.g., bentonite clays, polymers), depending upon the application and environment, would be within the knowledge of the skilled artisan in view of the teachings herein.

Most expansible materials, such as Bentonite clays, would be expected to achieve their maximum expansion (expanded volume compared to original volume before exposure to moisture or water) within 3-30 days after immersion in water. Thus, preferred water stops of the present invention should have an expansion of at least 120% (compared to original volume) within 3-30 days after immersion in water (around 21° C.).

For purposes of determining expansibility of the water stop body in water, it will be understood that tap water or local well water could provide a standard reference or approximation to the nature of water that one would expect to contact the water stop once installed. In further exemplary embodiments of the invention, such as where the construction of concrete joint is to occur in areas in which an installed water stop would be exposed to salt-containing water, such as in marine installations, it is preferable to use salt-containing water or sea water.

The rate and extent of water absorbed by water stop compositions of the present invention can be affected by the amount of salt dissolved in the water absorbed by the water stop. Tap water is expected to contain less than one percent salt content, and this would be similar to water absorbed by water stops installed in most non-marine applications. However, in some applications involving water having a high salt content, such as in marine applications or concrete construction joints in Middle East countries in which the water which invades the construction joint may contain up to 33%-35% salt by weight, it would be more appropriate to employ a modified Bentonite clay or other aqueously-swellable material that is better suited for water exposure (or immersion) wherein the water has a high salt content. For example, "salt water Bentonites" are commercially available which are better suited for use in making the swellable water stop compositions, and a 30%-35% salt solution (e.g., sodium chloride by weight in water) is more appropriate for testing the expansion property of the water stop intended for installation in applications wherein high salt content is expected to be found in the water which contacts the installed water stop.

In most marine installations, an eight percent salt solution (e.g., sodium chloride) can be used for immersing a water stop, and the water stop composition can employ "salt water Bentonite" clay and/or other high-rate swellable materials designed for swelling upon exposure to salt-containing water. For example, an 8% sodium chloride solution can be used for testing water stop compositions intended for many marine type installations.

Thus, in further exemplary embodiments of the invention, the water used for determining expansion of the water stop can be tap water, sea water, filtered water, or mixtures thereof, wherein salt content is 0%-35% by weight of water. Exemplary composition mixtures 12 which are used to making the elongate body 12 of the water stop 10 and which provide a Shore A hardness of 5 to 35 (at 21° C.) may comprise various mixtures of water-swellable material (e.g. Bentonite clay (including salt swellable Bentonite clays), vermiculite, smectite, montmorillonite, super absorbent polymers, swellable hydrophilic polymers, etc.) and/or at least one elastomer (e.g., butyl rubber, natural rubber, halogenated butyl rubber, ethylene propylene diene rubber (EPDM), neoprene rubber, vulcanized neoprene rubber), plasticizer (e.g., mineral oil, naphthenic oil, ester, vegetable oils, esters, liquid or low molecular weight polyisobutylene), and optional components such as non-swellable fillers (e.g., carbonates, talc, illite, quartz amorphous silica), pigments, polymers (e.g., polyacrylic acid, cross-linked polyacrylic acid, hydrophilic polyurethanes).

Preferred water stop composition mixtures 12 containing essentially no vulcanization agents or cross-linking agents. The water stop compositions of the present invention do not require vulcanization or cross-linking agents for maintaining shape or dimensional stability during storage, transportation, installation, and concrete pouring. While it is possible that a small amount of vulcanization agent or cross-linking agent could be used, depending upon the type of polymer or polymers employed, so as to adjusting the Shore A hardness of the water body so that it is within the preferred range of 5 to 35 (at 21° C.), the present inventors believe it is preferable to avoid use of vulcanizing agents or vulcanizing packages if possible because use or over-use could lead to unnecessary rigidity in the water stop body that could cause the force of poured concrete to wrench the water stop from its contact/adhesion on the concrete substrate, thus causing the snaking or curling phenomenon that was previously described above.

The Shore A hardness of the water stop body 12 composition mixture should preferably be at least 5 to minimize deformation or damage to the water stop body during concrete pouring, and should be no greater than 35 (at 21° C.) to provide sufficient malleability when applied onto irregular surfaces so as to achieve a fully bonded system and to withstand the swelling forces during water immersion. In combination with this hardness range (Shore A), the expansion of the water stop elongate body 12 should preferably be at least 120 percent of original volume (before swelling) after exposure to water. (This expansion refers to the aqueously-swellable composition comprising the water stop elongate body 12; as the pressure-sensitive adhesive is not deemed to be water-swellable). In other preferred embodiments, the water stop elongate body should have a swelling capacity of at least 130 percent and more preferably at least 140 percent, based on original volume before immersion in water (during 3-30 day period after initial immersion in water).

While it may be possible to employ small paper or polymer fibers for purposes of reinforcing the elongate water stop body 12, it is preferable that the elongate body be devoid of a metal or rigid polymer inner core or reinforcement which would impede the above-described Shore A hardness at all points along the at least one major face of the elongate water stop body and preferably at all points along all faces of the elongate water stop body.

Thus, an exemplary water stop of the present invention for preventing seepage within a concrete construction joint, comprises: an elongate body having at least one major face defined between generally parallel edges which extends along the direction of elongation; at least one layer of synthetic pressure-sensitive adhesive having an average layer thickness of at least 50 micrometers attached to the at least one major face of the elongate body; the elongate body being formed by shaping a composition mixture comprising aqueously-swellable fillers or polymers, at least one elastomer, and preferably (although not necessarily) at least one plasticizer, wherein the composition mixture after being shaped into the elongate body has a Shore A hardness of 35 or less, and more preferably having a Shore A hardness of 5 to 35, measured at 21° C., at all points along the at least one major face of the elongate water body; the elongate body thereby having a minimum swell rate of at least 120 percent of the original volume after exposure to water.

An exemplary method of the invention for waterproofing a concrete construction joint comprises application of the above-described water stop device 10, by installing the water stop 10 to a first concrete substrate surface by adhering the at least one pressure-sensitive synthetic adhesive layer 18 to the concrete surface; and then subsequently casting a second concrete onto the attached water stop (i.e., onto a second major face 14 which does not require a second pressure-sensitive synthetic adhesive layer although one can be optionally used).

Exemplary pressure-sensitive synthetic adhesive layer or layers (18) of the invention should be based upon synthetic rather than bituminous adhesive material which could curl and crack when exposed to extended sunlight. Examples of synthetic adhesives include butyl rubber, polyisobutylene, acrylic, styrene-isoprene-styrene (SIS), styrene-ethylene-butylene-styrene (SEBS), styrene-butadiene-styrene (SBS), styrene-butadiene rubber (SBR), ethylene propylene diene monomer (EPDM) rubber, or a combination of two or more of these materials. SIS is preferred. The elastomer or mixture of elastomers may be coated, for example, as a hot melt onto at least one major face of the water stop elongate body 12 to form the pre-formed layers (18), or made as preformed sheets which are then applied using nip rolls onto the major faces 16/14 of the water stop body 12. Other known manufacturing methods may be used.

The pressure-sensitive adhesive layer or layers 14/16 should be formulated to provide a fully bonded attachment to the substrate (e.g., concrete or any other construction material). However, if and when the concrete cracks or a void occurs, the aqueously-swellable composition which forms the water stop body 12 should be able to swell through the adhesive (14/16) and seal the crack or void.

In further exemplary embodiments of the invention, the water stop body may contain a very small amount of tackifier to improve feeling of the water stop to the hand and to improve grip to the hand. However, it is preferable to avoid tackifier use if possible, particularly as use of too much tackifier could make handling difficult and perhaps create conflicts with the separate pressure-sensitive adhesive layer whose function it is to attach the water stop body firmly in place so that it will expand properly within the concrete construction joint when exposed to water. Thus, further embodiments of the water stop and methods of using the water stop will involve use of 0%-1.5% tackifier and more preferably 0%-1.0% tackifier. Selection of tackifier would depend on the elastomer or elastomers used.

In further exemplary water stops of the invention, the tack-to-hand feeling of the water stop could be modified by using components on the surface of the water stop, such as non-swellable fillers (some of which are mentioned in the following examples below).

The present invention also provides methods wherein the afore-mentioned water stop is employed within a construction joint. Thus, an exemplary method of the invention for waterproofing a concrete construction joint comprises attaching the pressure-sensitive adhesive layer of the afore-mentioned water stop onto a first concrete surface, and subsequently casting a second concrete onto the elongate body of the water stop. The water stop body then is effective to expand within the construction joint formed by the first and second concrete structures and thereby to prevent or to minimize seepage of water through the construction joint formed between the first and second concrete structures.

Thus, an exemplary method for waterproofing a construction joint comprises: attaching onto a first concrete surface a water stop having an elongate body having at least one major face defined between generally parallel edges which extend along the direction of elongation; the water stop further comprising at least one layer of pressure-sensitive adhesive having an average layer thickness of at least 50 micrometers attached to the at least one major face of the elongate body; the elongate body being formed by shaping a composition mixture comprising aqueously-swellable ingredients wherein the composition mixture after being shaped into the elongate body has a Shore A hardness less than 35 (measured at 21° C.); the elongate body having a volume expansion of at least 120 percent of the original volume after immersion in water (3-30 days after water immersion); and subsequently casting a second concrete onto the elongate body of the water stop.

EXAMPLES 1-4

Aqueously-swellable water stop bodies of the invention preferably comprise a composition mixture having water-swellable fillers or polymers, at least one synthetic elastomer, and preferably but not necessarily at least one plasticizer, with optional components such as non-swellable fillers (e.g., carbonates, quartz, amorphous silicon dioxide, illite, kaolinite, mica, talc, pigment, superabsorbent polymer). The water stop composition also comprised essentially no vulcanization agents that would function to cross-link polymers and hence to increase the Shore A hardness (measured at 21° C.). Four examples of composition mixtures were formed into water stop bodies having various hardness durometer values (Shore A), measured at 21° C., using the following components and weight percentages. Examples are summarized in Table 1 below.

TABLE 1

| | Examples: | | | |
|---|---|---|---|---|
| | #1 | #2 | #3 | #4 |
| Swellable Bentonite | 40% | 30% | 60% | 75% |
| Elastomer (butyl rubber) | 10% | 14.5% | 14.5% | 15% |
| Plasticizer | 19% | 18% | 20% | 16% |
| Non-swellable Filler | 26% | 33.5% | 4.5% | 0% |
| Pigment | 2% | 1% | 1% | 1% |
| Superabsorbent Polymer | 3% | 3% | 0% | 0% |
| Total | 100% | 100% | 100% | 100% |
| Shore A Hardness | 8 | 10 | 13 | 25 |
| Swelling Percentage | 150% | 250% | 235% | 450% |

The water stops made using the composition mixtures in combination with pressure sensitive adhesive layers provided good bonding to a concrete substrate even while exposed to weather over a 45 day period. Good bonding was obtained even when the water stops were immersed in water for a 3 day period.

Exemplary water stop devices of the invention should have an expansion of at least 120% (compared to original volume) and preferably should be able to expand 350%, 450%, or more based on original volume (and thus a preferred expansion range would be 120%-620%) based on original volume. For example, the sample having the highest expansion capability was seen above in #4 which expanded 450%; or, in other words, it swelled 550% of the original volume.

EXAMPLE 4B

Another water-swellable water stop body was made using components summarized in Table 2 below. This water stop was formulated using a commercially available Bentonite clay selected for swelling in a salt-containing water. This example, therefore, was directed to water stops that are intended to be used in typical marine salt-water environments. The water used for swelling the water stop contained eight percent (8%) salt (sodium chloride) by weight of the solution. The number 8% was chosen as this covered sea water applications wherein sea water typically has around 3% salt content by weight of solution.

TABLE 2

|  | #1 |
| --- | --- |
| Swellable Bentonite (salt water) | 66% |
| Elastomer (butyl rubber) | 10% |
| Plasticizer | 19% |
| Pigment | 2% |
| Superabsorbent Polymer | 3% |
| Total | 100% |
| Shore A Hardness | 9 |
| Swelling Percentage (in 8% salt water) | 250% |

The water stop made using the composition summarized in Table 2 above was combined with a pressure-sensitive adhesive layer. This combination was found to provide good bonding to a concrete substrate. The bonding remained good even after the water stop was immersed in tap water for a three-day period. The present inventors also confirmed that bonding was good even after the water stop was immersed in a 3% (by weight) solution of sodium chloride for a three-day period; and, in addition, that bonding was good even after the water stop was immersed in an 8% (by weight) solution of sodium chloride for a three-day period. This water stop composition was also immersed in 33% sodium chloride solution for three days, and was found to expand up to 140% of its original volume (or, in other words, it expanded by 40%).

EXAMPLE 5

A water stop body was made containing a water-swellable polyurethane polymer that was produced by reacting an isocyanate (4,4 MDI, polymeric MDI, TDI) with a polyol, and this polymers was mixed with pigments (carbon black, iron oxide, chromium oxide), non water swelling fillers (talc, kaolinite, illite, quartz) resulting in a compound of Shore A hardness of 25 and a volume expansion of 210% in water. The water stop dimensions were approximately 20 mm×10 mm. The water stops made using the composition mixtures in combination with pressure sensitive adhesive layers provided good bonding to a concrete substrate during a three day period when completely immersed in water.

EXAMPLE 6 (COMPARATIVE)

A water stop body was made containing a water-swellable polyurethane polymer produced by reacting an isocyanate (4,4 MDI and polymeric MDI) with a polyol. The polymer was mixed with pigments (blue and titanium dioxide) resulting in a compound of Shore A hardness of 50 and a volume expansion of 320% in water. The water stop dimensions were approximately 20 mm×10 mm. When combined with a pressure-sensitive adhesive layer, the water stop gave good bonding to a dry concrete substrate but debonded after a six hour period when immersed in water.

EXAMPLE 7 (COMPARATIVE)

A water stop body was made containing SEBS thermoplastic elastomer, a plasticizer, non-water swelling fillers (talc, calcium carbonate), carbon black and a super absorbent polymer as water swelling filler. The water stop dimensions were approximately 20 mm×5 mm. The shore A hardness of this compound is 53 and the volume expansion is 535%. The water stop made using the composition mixtures in combination with pressure sensitive adhesive layers provided good bonding to a dry concrete substrate but debonded after one day complete immersion in water.

EXAMPLE 8 (COMPARATIVE)

A commercially available, swellable Bentonite water stop was combined with a pressure-sensitive adhesive layer. This commercial water stop was confirmed through durometer testing to have Shore A hardness of 62 (measured at 21° C.). When adhered to a concrete surface using the pressure-sensitive adhesive, the water stop expanded 290% (i.e., it swelled up to 390% of original volume); but this sample debonded from the concrete surface after one day of immersion in water, thus failing the test.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

It is claimed:

1. A water stop for preventing seepage within a concrete construction joint, comprising:
    an elongate body having at least one major face defined between generally parallel edges which extend along the direction of elongation;
    at least one layer of pressure-sensitive adhesive having an average layer thickness of at least 50 micrometers attached to the at least one major face of the elongate body;
    the elongate body being formed by shaping a composition mixture comprising aqueously-swellable ingredients wherein the composition mixture after being shaped into the elongate body has a Shore A hardness less than 35 when measured at 21° C.; and
    the elongate body having a volume expansion of at least 120 percent of the original volume after immersion in water.

2. The water stop of claim 1 wherein the elongate body has the shape of a strip, ribbon, or bar.

3. The water stop of claim 1 being devoid of inner core or reinforcement structure.

4. The water stop of claim 1 wherein the elongate body is formed by extrusion of a composition comprising an aqueously-swellable component, at least one elastomer, and at least one plasticizer, into a strip, ribbon, or bar form.

5. The water stop of claim 1 wherein the composition further comprises a pigment, a non-swellable filler, an additional polymer, or mixture thereof.

6. The water stop of claim 1 wherein the elongate body has at least two major faces.

7. The water stop of claim 1 wherein the elongate body has a pressure-sensitive adhesive layer attached to at least two major faces of the elongate body.

8. The water stop of claim 1 wherein the pressure-sensitive synthetic adhesive comprises butyl rubber, polyisobutylene, acrylic, styrene-isoprene-styrene (SIS), styrene-ethylene-butylene-styrene (SEBS), styrene-butadiene-styrene (SBS), styrene-butadiene rubber (SBR), ethylene propylene diene monomer (EPDM), or a combination of two or more of these materials.

9. The water stop of claim 1 wherein the pressure-sensitive synthetic adhesive is SIS.

10. The water stop of claim 1 wherein the at least one pressure-sensitive synthetic adhesive covers 10%-90% of one of the major faces of the water stop body.

11. The water stop of claim 1 wherein the at least one pressure-sensitive synthetic adhesive is wider than the major face to which it is attached.

12. The water stop of claim 1 being devoid of metal or rigid polymer inner core or reinforcement which would impede the above-described Shore A hardness at all points along the at least two major faces of the elongate water body.

13. A water stop of claim 1 wherein the water used for determining expansion of the water stop contains a salt in the amount of up to 35% based on weight of water.

14. The water stop of claim 1 wherein the swellable ingredients comprising the water stop composition includes a salt water swellable Bentonite clay.

15. A method for waterproofing a concrete construction joint, comprising: applying the water stop of claim 1 to a first concrete substrate surface; and subsequently casting a second concrete onto the water stop of claim 1.

16. The water stop of claim 1 having a Shore A hardness of 5-35.

17. The water stop of claim 1 having a Shore A hardness of 5-25.

18. The water stop of claim 1 having a Shore A hardness of 10-20.

19. The water stop of claim 1 having a Shore A hardness of 10-15.

20. A method for waterproofing a concrete construction joint, comprising: attaching, onto a first concrete surface, a water stop having an elongate body having at least one major face defined between generally parallel edges which extend along the direction of elongation; the water stop further comprising at least one layer of pressure-sensitive adhesive having an average layer thickness of at least 50 micrometers attached to the at least one major face of the elongate body; the elongate body being formed by shaping a composition mixture comprising aqueously-swellable ingredients wherein the composition mixture after being shaped into the elongate body has a Shore A hardness less than 35 when measured at 21° C.; the elongate body having a volume expansion of at least 120 percent of the original volume after immersion in water; and subsequently casting a second concrete onto the elongate body of the water stop.

* * * * *